April 7, 1942.    M. E. McCLELLAN    2,279,004
RATCHET LEVER
Filed March 5, 1941
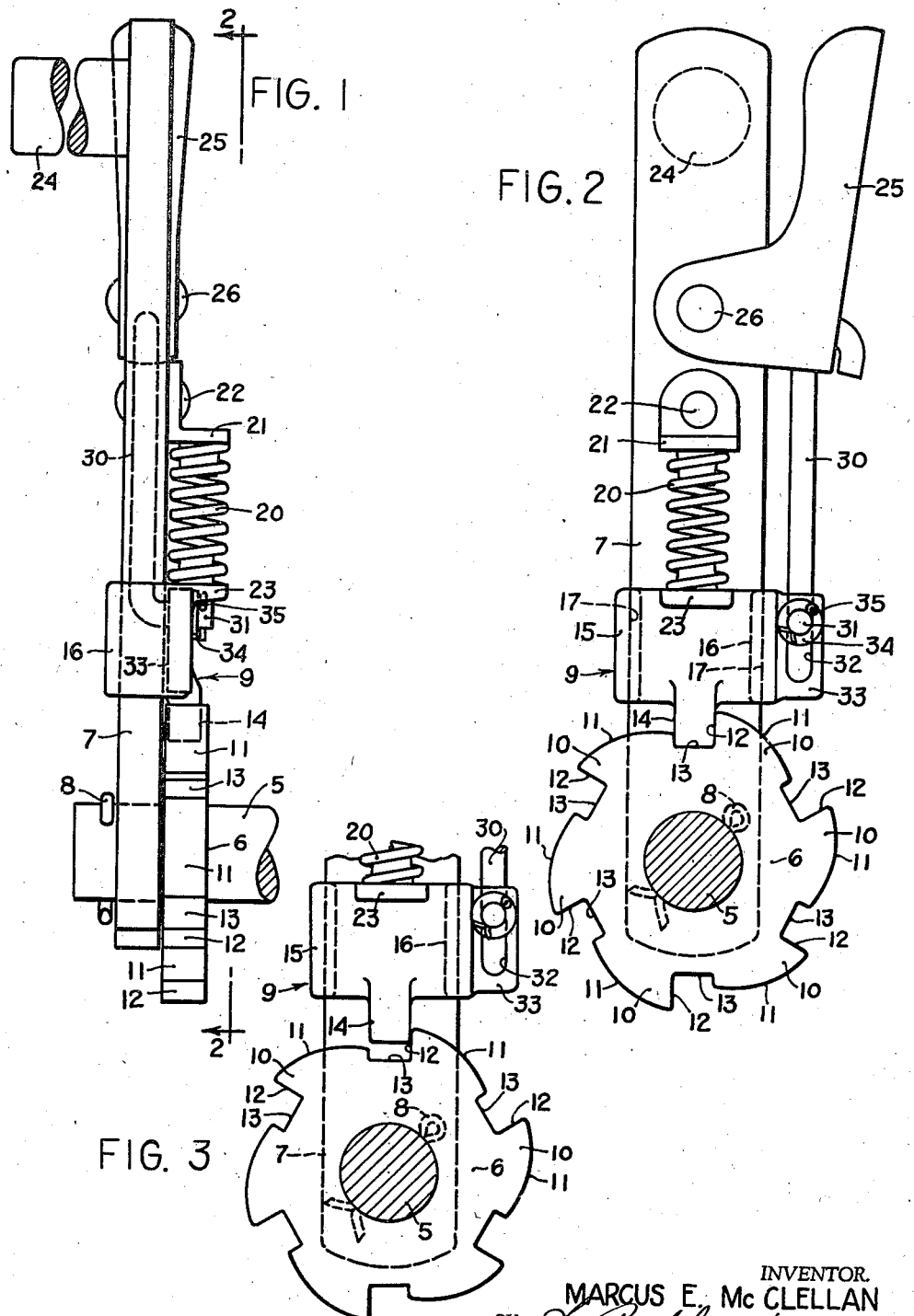
INVENTOR.
MARCUS E. McCLELLAN Patented Apr. 7, 1942

2,279,004

UNITED STATES PATENT OFFICE 2,279,004

RATCHET LEVER

Marcus E. McClellan, Ottumwa, Iowa, assignor to Dain Manufacturing Company of Iowa, Ottumwa, Iowa, a corporation of Iowa Application March 5, 1941, Serial No. 381,798

3 Claims. (Cl. 74—156)

The present invention relates to ratchet levers and has as its principal object the provision of an actuating lever which is normally connected in fixed relation to a shaft to serve as a crank arm for rotating the shaft, but which can be made to operate as a ratchet by merely depressing a latch or hand grip on the lever. Thus, when the shaft and its connected load offers considerable resistance to turning, the lever can be changed to a ratchet connection and the shaft can then be turned by oscillating the lever through a small angle at the position in which the greatest force can be exerted on it.

Other objects and advantages of the present invention will become apparent to those skilled in the art after consideration of the following description of the preferred embodiment thereof, reference being had to the accompanying drawing, in which Figure 1 is a side elevation of a ratchet lever constructed according to the principles of my invention;

Figure 2 is a sectional view of the same taken along the line 2—2 in Figure 1, showing the lever fixedly locked to the shaft for operation as a crank handle; and Figure 3 is a fragmentary view similar to Figure 2, but showing the lever connected with the shaft to function as a ratchet.

Referring now to the drawing, the reference numeral 5 indicates a rotatable shaft having a toothed ratchet wheel 6 fixedly secured thereto near one of its ends. A lever 7 is journaled on the shaft 5 on the outside of the ratchet wheel 6 and is held in place thereon by a cotter pin 8 which extends through a hole in the shaft. Carried on the lever 7 is a pawl 9 which is engageable with the teeth of the ratchet wheel 6 in a manner to be described presently to provide either a positive connection or a ratchet connection, at option, between the lever and the shaft.

The ratchet wheel 6 is provided with a plurality of teeth 10, each of which has an inclined cam surface 11 and a substantially perpendicular working face 12. Formed in the outer edge of the wheel 6 between the cam surface 11 of each tooth and the face 12 of the adjoining tooth is a notch 13 which is adapted to receive the tongue 14 of the pawl 9.

The pawl 9 is slidably mounted on the lever 7 for movement toward and away from the wheel 6, and may be in the form of a casting having shoulder flanges 15 and 16 which are slotted at 17 to receive the edges of the lever for guiding the pawl. The tongue 14 of the pawl extends downwardly from the lower edge of the casting and is disposed in the track of the ratchet teeth 10. The pawl 9 is urged toward the ratchet wheel 6 by a spring 20 which bears at one end against an angle bracket 21 riveted at 22 to the lever, and at the other end against a shelf 23 projecting outwardly from the top edge of the pawl casting.

Normally, the tongue 14 of the pawl is seated in one of the notches 13 and is held therein by the spring 20, as shown in Figures 1 and 2. In this condition, the lever 7 is fixedly locked to the shaft 5, and the latter can be turned in either direction by the lever. A crank handle 24 is fixed to the outer end of the lever to facilitate turning the shaft. When the shaft and its connected load offers considerable resistance to turning, however, a much greater turning effort can be exerted thereon by lifting the pawl tongue 14 out of its notch 13 to the position shown in Figure 3. This enables the lever to be used as a ratchet, and permits the lever to be oscillated through a small angle at the position in which the greatest force can be applied thereto.

The pawl 9 is lifted to the ratchet position by means of a hand grip 25 which is pivoted at 26 to the outer end of the lever and is connected with the pawl by a link 30. The lower end of the link 30 is bent laterally at 31 and passes through a vertical slot 32 provided in a flange 33 projecting outwardly from the shoulder 16. A washer 34 and cotter pin 35 retain the end 31 of the link within the slot 32. The slot 32 provides the necessary lost motion in the connection between the pawl 9 and link 30 permitting the pawl to rise and fall as it is lifted by the cam portions 11 of the ratchet teeth without causing the hand grip 25 to oscillate.

To operate the lever as a ratchet, the hand grip 25 is held against the lever, and the latter is then rocked back and forth. Each time that the lever rocks in a counter-clockwise direction, the pawl rides up over the cam portion 11 of the tooth and drops behind the working face thereof. On the clockwise rocking movement, the ratchet wheel 6 and connected shaft 5 are rocked with the lever. When the hand grip 25 is released, the pawl 9 is urged by the spring 20 down into one of the notches 13 and the lever is thereby locked fixedly to the shaft enabling the latter to be turned in either direction by the lever.

What I claim as my invention is:

1. In combination, a rotatable shaft, a toothed ratchet wheel fixed thereto, a lever journalled on the shaft, a pawl member carried on said lever and engageable with said wheel, said pawl member being movable in a direction radial to the axis of the shaft between a first position in which it is operative to lock the lever fixedly to the ratchet wheel, and a second position wherein the pawl is adapted to ratchet over the teeth of said ratchet wheel in one direction, and means for moving said pawl from one position to the other.

2. In combination, a rotatable shaft, a toothed ratchet wheel fixed thereto, said ratchet wheel having at least one notch formed therein adjacent the teeth, a lever journaled on said shaft, a pawl on said lever engageable with said ratchet wheel to advance the wheel in one direction when the lever is oscillated, said pawl being movable radially with respect to said ratchet wheel into said notch to lock the lever fixedly to the ratchet wheel for turning the latter in either direction, and means for moving said pawl into and out of said notch.

3. In combination, a rotatable shaft, a toothed ratchet wheel fixed thereto, a lever journaled on the shaft, a spring-pressed pawl mounted on said lever for sliding movement along the length thereof and engageable with the teeth of the ratchet wheel to provide a ratchet connection therewith, said ratchet wheel having notches formed therein at the bottoms of the teeth adapted to receive said pawl for locking the lever positively to the ratchet wheel, and means for moving said pawl into and out of engagement with said notches.

MARCUS E. McCLELLAN.